United States Patent [19]

Miura et al.

[11] Patent Number: 4,879,596
[45] Date of Patent: Nov. 7, 1989

[54] STEREOSCOPIC CAMERA APPARATUS WHICH INCORPORATES CAMERAS AND CAN COMMONLY ADJUST DIRECTIONS OF THE CAMERAS

[75] Inventors: Kenichi Miura; Hiromichi Kobayashi, both of Yokohama, Japan

[73] Assignee: Kabushiki Kaisha Toshiba, Kawasaki, Japan

[21] Appl. No.: 293,672

[22] Filed: Jan. 5, 1989

[30] Foreign Application Priority Data

Jan. 8, 1988 [JP] Japan .................................. 63-1195

[51] Int. Cl.⁴ ............................................ H04N 13/02
[52] U.S. Cl. ...................................... 358/88; 358/229
[58] Field of Search ...................... 358/88, 3, 209, 229; 352/57

[56] References Cited
U.S. PATENT DOCUMENTS 4,021,846  5/1977  Roese ..................................... 358/92
4,418,993  12/1983 Lipton .................................... 352/57
4,751,570  6/1988  Robinson .............................. 358/88

*Primary Examiner*—Howard W. Britton
*Attorney, Agent, or Firm*—Cushman, Darby & Cushman

[57] ABSTRACT

In a sterescopic camera supporting apparatus of this invention, first and second image pickup elements incorporated in first and second cameras which are independent of each other so as to obtain a stereoscopic image are attached to corresponding holders by elongated apertures formed in mounting portions of the first and second cameras and screws loosely fitted in the elongated apertures, so as to be pivotally adjusted in plane directions perpendicular to optical axes of the first and second cameras. The first camera is attached to a first sub frame by elongated apertures formed in the mounting portion of the first camera and screws loosely fitted in the elongated apertures to be vertically pivoted about the optical axis for adjustment. The second camera is attached to a second sub frame by elongated apertures formed in the mounting portion of the second camera and screws loosely fitted in the elongated apertures to be pivotally adjusted in a horizontal direction perpendicular to the vertical pivot direction of the first camera. The first and second sub frames are attached to one and the other end portions of a main frame, so that the first and second cameras are integrated.

6 Claims, 5 Drawing Sheets

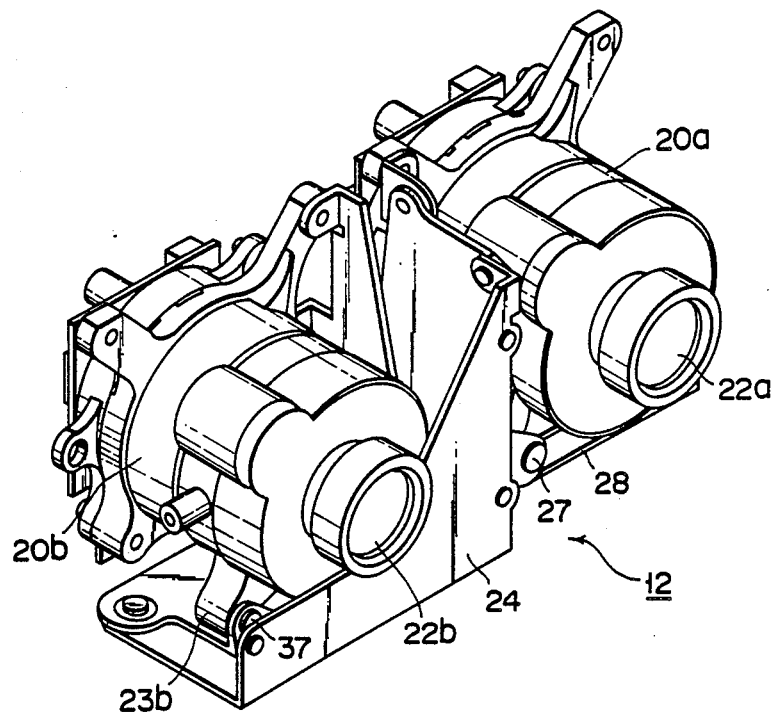
F I G. 2

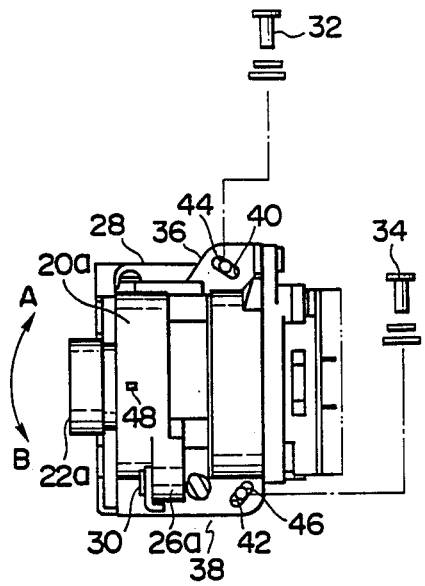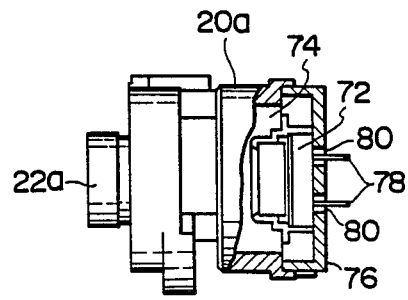
FIG. 3C  FIG. 4A
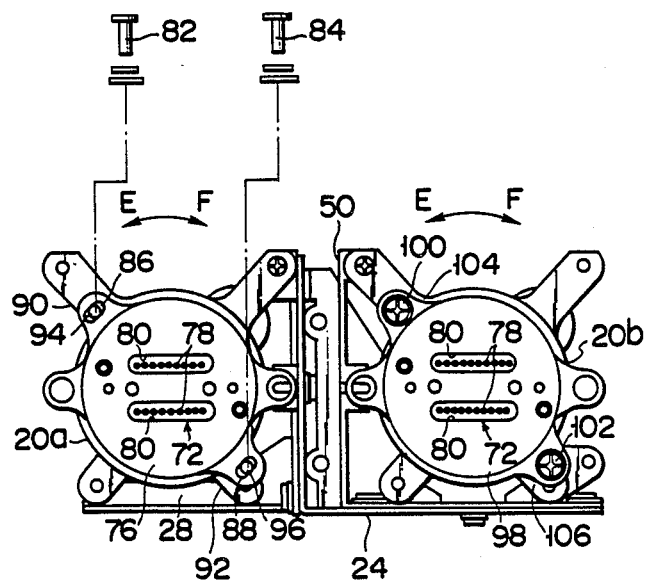
FIG. 4B

STEREOSCOPIC CAMERA APPARATUS WHICH INCORPORATES CAMERAS AND CAN COMMONLY ADJUST DIRECTIONS OF THE CAMERAS

BACKGROUND OF THE INVENTION

1. Field of the Invention

The present invention relates to a stereoscopic camera apparatus for obtaining a stereoscopic image and, more particularly, to a stereoscopic electronic camera apparatus which incorporates cameras and can commonly adjust directions of the cameras.

2. Description of the Related Art

Recently, as a technique for obtaining a stereoscopic image, a stereoscopic camera apparatus comprising two cameras is developed. As is well known, the stereoscopic image is obtained as follows. Two independent cameras are arranged to be separated at a predetermined distance, an identical object is picked up by the two cameras, and video signals obtained from these cameras are subjected to time-divisional processing by a time-division circuit. With this time-divisional processing, a stereoscopic image can be obtained by utilizing a difference in image due to a parallax of man's eyes, and a convergence visual angle. Such a technique is described in U.S. Pat. No. 4,021,846. For example, video signals from two cameras which are arranged to be separated at a predetermined interval and to have a predetermined convergence angle are converted to stereoscopic video signals by a time-divisional processing circuit. An image is displayed on a monitor television based on the converted video signals. A user views the display screen of the monitor television through liquid-crystal shutter spectacles driven in synchronism with the time-divisional processing of the time-divisional processing circuit, thus achieving a stereoscopic view.

The directions, i.e., vertical and horizontal directions of the two independent cameras must be adjusted so that images can accurately coincide with each other on an imaginary plane to achieve a stereoscopic view. More specifically, the interval and convergence angle between the two cameras (lenses) must be adjusted so as not to cause offsets in the vertical and horizontal directions of the cameras and a rotational offset about the optical axis of each camera.

However, since the two independent cameras are mounted on separate pan heads, when the directions are adjusted by moving these pan heads, the interval and convergence angle of the cameras are shifted during adjustment, resulting in unbalance. Therefore, the adjusting operation is very difficult to achieve, and requires a long period of time.

SUMMARY OF THE INVENTION

It is therefore an object of the present invention to provide a stereoscopic camera supporting apparatus which can facilitate a direction adjusting operation or two cameras and can perform the adjustment operation within a short period of time in order to obtain a stereoscopic image.

According to an aspect of the present invention, there is provided an electronic image pickup device which comprises: first and second image pickup means which are independent of each other so as to obtain a stereoscopic image; a supporting member capable of integrally supporting the first and second image pickup means so that their optical axes are aligned in the same direction; first and second supporting means for supporting the first and second image pickup means on the supporting member to be pivotal in a first plane direction so as to perform adjustment in the first plane direction perpendicular to the optical axes of the first and second image pickup means; third supporting means for supporting the first or second image pickup means on the supporting member to be pivotal in a second plane direction so as to perform adjustment in the second plane direction perpendicular to the first plane direction; and fourth supporting means for supporting the second or first image pickup means on the supporting member to be pivotal in a third plane direction so as to perform adjustment in the third plane direction perpendicular to the first and second plane directions.

BRIEF DESCRIPTION OF THE DRAWINGS

The aforementioned aspects and other features of the present invention are explained in the following description, taken in connection with the accompanying drawings wherein:

FIG. 2 is a perspective view showing the image pickup unit of the stereoscopic camera apparatus shown in FIG. 1;

FIGS. 3A through 3C show the image pickup unit shown in FIG. 2, in which FIG. 3A is a plan view, FIG. 3B is a front view, and FIG. 3C is a side view;

FIGS. 4A and 4B show the image pickup unit shown in FIG. 2, in which FIG. 4A is a partially cutaway side view, and FIG. 4B is a bottom view;

DETAILED DESCRIPTION OF THE PREFERRED EMBODIMENT

An embodiment of the present invention will now be described with reference to the accompanying drawings.

Figure 1:
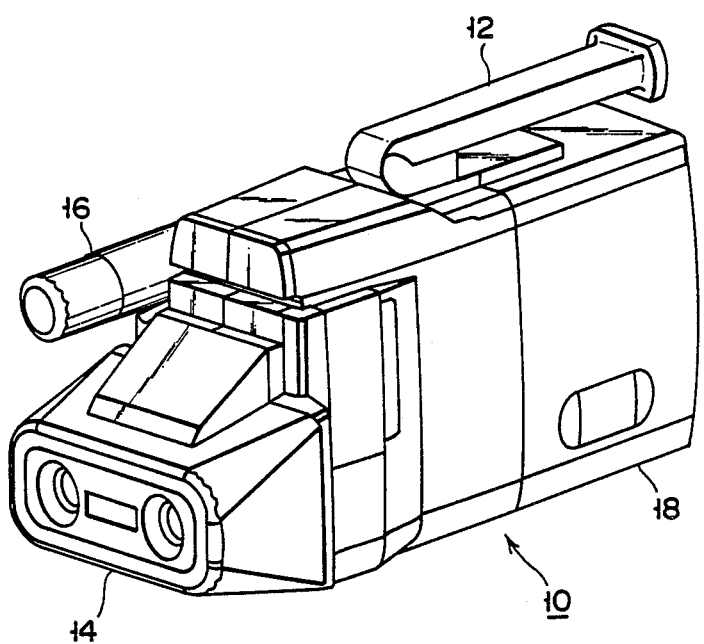
FIG. 1 is a perspective view of an outer appearance of a stereoscopic camera apparatus in which an image pickup unit according to the present invention is integrally assembled.

FIG. 1 is a perspective view of the outer appearance of a stereoscopic camera apparatus in which an image pickup unit according to the present invention is integrally assembled. Reference numeral 10 denotes a main body of the stereoscopic camera apparatus for obtaining a stereoscopic camera apparatus. Apparatus main body 10 comprises view finder unit 12 for allowing the user to observe an image to be obtained as a stereoscopic image, image pickup unit 14 (to be described later in detail) for picking up an image corresponding to an image viewed through view finder unit 12, voice recording unit 16, comprising a microphone and the like for recording voice data; and signal processing unit 18 for converting an image obtained by image pickup unit 14 and voice data obtained by voice recording unit 16 into electrical signals. These units are covered with covers, respectively. The electrical signals processed by signal processing unit 18 can be transferred to a monitor television (not shown) via a cable or the like.

Note that a video tape recorder unit for recording the electrical signals processed by signal processing unit 18 may be integrally assembled in the stereoscopic camera apparatus. In this case, an arrangement capable of transferring a reproduction output from the video tape recorder unit through a cable or the like to the monitor television (not shown) is preferably employed.

Image pickup unit 14 has two cameras 20a and 20b, as shown in FIG. 2. Camera lens portions 22a and 22b at the centers of these two cameras 20a and 20b, respectively, are juxtaposed on main frame 24 to be directed in the same direction. Each of camera lens portions 22a and 22b includes a plurality of lenses (not shown), and the plurality of lenses are moved in a predetermined direction to perform focusing. Cameras 20a and 20b include image pickup elements (not shown) for converting images picked up by camera lens portions 22a and 22b into electrical video signals, as will be described later. Thus, light from an object is guided to the image pickup elements through camera lens portions 22a and 22b of cameras 20a and 20b, and the electrical signals are supplied from the image pickup elements to signal processing unit 18.

Figure 3A:
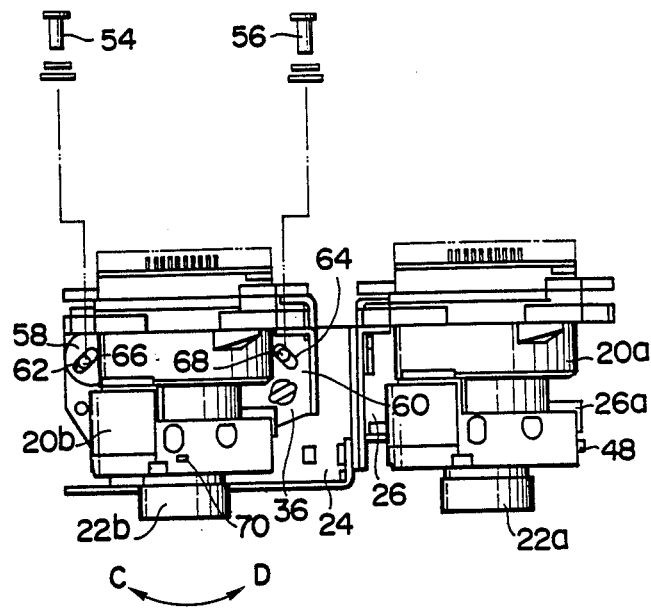
Figure 3B:
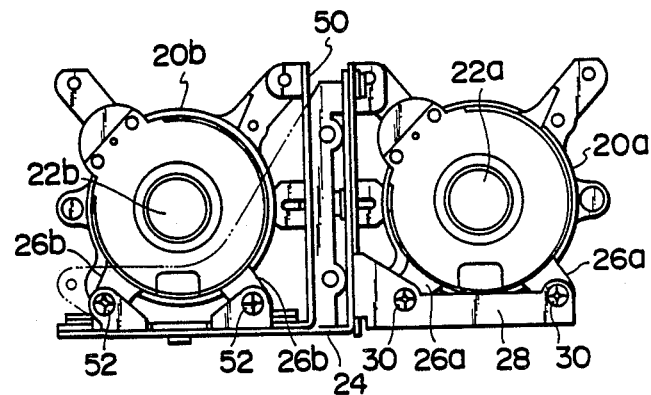

Camera 20a is used for, e.g., the left eye. As shown in FIGS. 3A through 3C, legs 26a projecting from camera 20a are fixed by screws 30 to sub frame 28 mounted on one end portion of main frame 24. Camera 20a is fixed to sub frame 28 such that screws 32 and 34 are loosely fitted in arcuated elongated apertures 40 and 42 formed in upper and lower mounting portions 36 and 38 of camera 20a in FIG. 3C and are threadably engaged with screw apertures 44 and 46 formed in sub frame 28. Thus, camera 20a can be pivotally adjusted in the vertical direction, i.e., directions indicated by arrows A and B in FIG. 3C about pivot 48 with respect to sub frame 28.

On the other hand, camera 20b is used for, e.g., the right eye, and is supported on sub frame 50 attached to the other end portion of main frame 24. Camera 20b is supported on sub frame 50 such that legs 26b projecting from camera 20b are fixed by screws 52, as shown in FIG. 3A. Screws 54 and 56 are loosely fitted in arcuated elongated apertures 62 and 64 formed in left and right mounting portions 58 and 60 in FIG. 3A of camera 20b and are threadably engaged with screw apertures 66 and 68 formed in sub frame 50. Thus, camera 20b can be pivotally adjusted in the vertical direction, i.e., in directions indicated by arrows C and D in FIG. 3A about pivot 70 with respect to sub frame 50. Cameras 20a and 20b are integrally assembled on sub frames 28 and 50 attached to main frame 24.

Cameras 20a and 20b incorporate aforementioned image pickup elements 72, as shown in FIGS. 4A and 4B. For example, image pickup element 72 incorporated in camera 20a is attached to holder 76 closing rear-side (side opposite to camera lens portion 22a) opening 74 of camera 20a. Leads 78 of image pickup element 72 are loosely fitted in and extend outside through elongated apertures 80 formed in holder 76. Two screws 82 and 84 are loosely fitted in arcuated elongated apertures 86 and 88 formed in the edge portion of holder 76 and are threeadably engaged with screw apertures 94 and 96 formed in mounting portions 90 and 92 of camera 20a. Thus, camera 20a can be pivotally adjusted about its optical axis in directions indicated by arrows E and F in FIG. 4B.

Only image pickup element 72 of camera 20a has been described. However, this applies to image pickup element 72 of camera 20b. More specifically, image pickup element 72 in camera 20b is attached to holder 98, which is fixed to camera 20b by two screws 100 and 102. Screws 100 and 102 are loosely fitted in arcuated elongated apertures (not shown) formed in the edge portion of holder 98 and are threadably engaged with screw apertures (not shown) formed in mounting portions 104 and 106 of camera 20b. Camera 20b can be pivotally adjusted about its optical axis in directions indicated by arrows E and F in FIG. 4B.

An adjusting operation of a stereoscopic image will be explained below with reference to FIGS. 1 through 4A and 4B and FIGS. 5 and 6.

Figure 5:
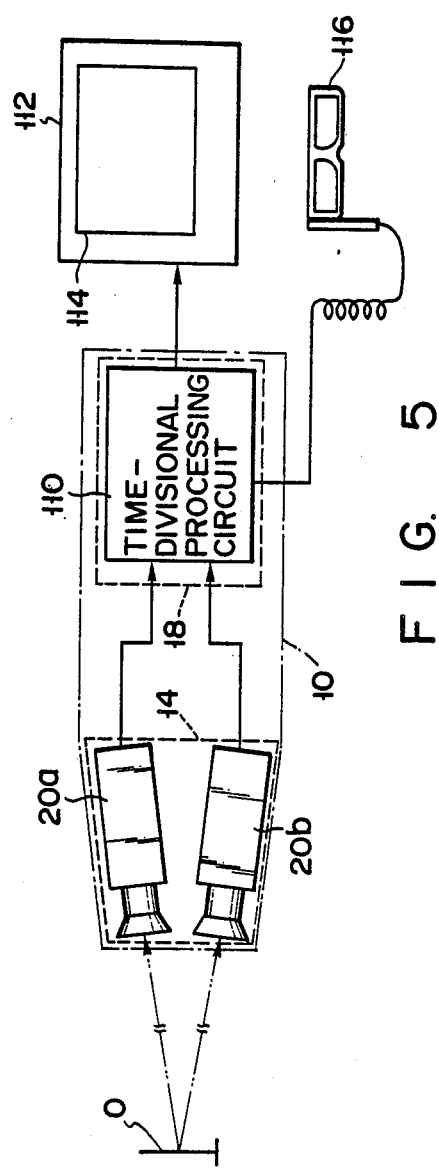
FIG. 5 is a block diagram schematically showing a system for obtaining a stereoscopic image.

FIG. 5 schematically shows a system for obtaining a stereoscopic image. In this system, an image of object O is picked up by stereoscopic camera apparatus 10. More specifically, the image of object O is picked up by cameras 20a and 20b which are installed to be separated at a predetermined interval and to have a predetermined convergence angle. Light components from object O picked up through camera lens portions 22a and 22b of cameras 20a and 20b in image pickup unit 14 are converted into electrical signals by corresponding image pickup elements 72. The electrical signals converted by image pickup elements 72 are supplied to signal processing unit 18 as output video signals from cameras 20a and 20b. In signal processing unit 18, the output signals are converted to stereoscopic video signals for forming a stereoscopic image by known time-divisional processing circuit 110. The stereoscopic video signals are transferred to monitor television 112 through a cable or the like, so that the image of object O can be displayed on display screen 114 of monitor television 112.

Reference numeral 116 denotes liquid-crystal shutter spectacles, which switch left and right liquid-crystal lenses at a predetermined timing. Liquid-crystal shutter spectacles 116 are described in detail in the aforementioned U.S. Pat. No. 4,021,846. The switching timing of the left and right liquid crystal lenses of liquid-crystal shutter spectacles is synchronized with time divisional processing of time-divisional processing circuit 110. That is, when a user views display screen 114 of monitor television 112 through liquid-crystal shutter spectacles 116, a stereoscopic image can be obtained by liquid-crystal shutter spectacles 116 which is driven in synchronism with the time-divisional processing of time-divisional processing circuit 110.

Figure 6:
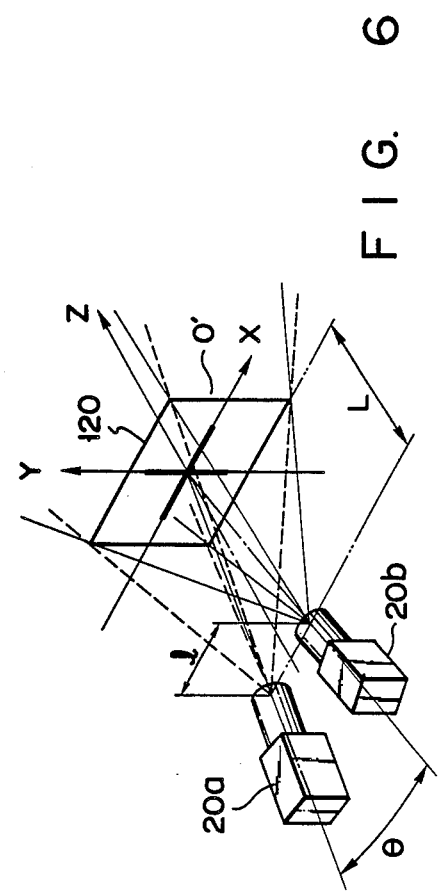
FIG. 6 is a view for explaining a direction adjustment method using two cameras of the image pickup unit, and showing the relationship between the image pickup unit and an imaginary screen.

Adjustment required for obtaining a stereoscopic image will be described below with reference to FIG. 6.

Stereoscopic camera apparatus 10 is fixed at a position separated from imaginary screen 120 for stereoscopic view by predetermined distance L (e.g., 5 m) using a pan head, for the purpose of adjusting a camera position. In this case, the cover of image pickup unit 14 housing cameras 20a and 20b is opened. Object O' written with, e.g., a cross is set at the position of imaginary screen 120, so that shifts of the camera in the vertical direction, the horizontal direction, and the rotational direction about the optical axis of the camera can be discriminated. Two cameras 20a and 20b are adjusted to have predetermined interval l and predetermined convergence angle $\theta$. Interval l is an interval between points where object O' is left fixed in position even when cameras 20a and 20b are moved. When images of object O' picked up by cameras 20a and 20b overlap each other, convergence angle $\theta$ represents an angle having the overlapping point of the images of the object as the center. The relationship among interval l between cameras 20a and 20b, convergence angle θ, and distance from object O' is expressed by $\theta \approx 1/L$.

Adjustment of cameras 20a and 20b can be started from either one. For example, when an image of object O' is picked up by left-eye camera 20a, right-eye camera 20b is set not to form an image. On the contrary, when an image of object O' is picked up by right-eye camera 20b, left-eye camera 20a is set not to form an image. In this manner, the image of object O' picked up by camera 20a or 20b is displayed on display screen 114 of monitor television 112.

Imaginary screen 120 (object O') is focused while observing display screen 114 of monitor television 112. More specifically, distance L between cameras 20a and 20b and object O' on imaginary screen 120, as a Z direction in FIG. 6, is determined. Interval 1 between cameras 20a and 20b is adjusted. Camera 20a is adjusted while observing the cross of object O' displayed on display screen 114, so that its optical axis coincides with that of camera 20b in the vertical direction (a Y direction in FIG. 6). This adjustment is achieved such that camera 20a is vertically pivoted in the directions of arrows A and B in FIG. 3C about pivot 48 by means of two screws 32 and 34 and two elongated apertures 40 and 42. At the same time, camera 20b is adjusted so that its optical axis coincides with that of camera 20a in the horizontal direction (an X direction in FIG. 6) in order to obtain a predetermined convergence angle. More specifically, camera 20b is vertically pivoted in the directions of arrows C and D in FIG. 3A about pivot 70 by means of two screws 54 and 56 and two elongated apertures 62 and 64 while observing the cross of object O' displayed on display screen 114, in the same manner as in the vertical direction. After adjustment in the vertical and horizontal directions is performed, offsets about the optical axes of cameras 20a and 20b are finally adjusted while observing the cross of object O' displayed on display screen 114. More specifically, holders 76 and 98 are pivoted in the directions of arrows E and F in FIG. 4B by means of screws 82 and 84, elongated apertures 86 and 88, screws 100 and 102, and elongated apertures (not shown) through which screws 100 and 102 are loosely fitted, thereby adjusting image pickup elements 72 about their optical axes.

In this manner, two kinds of adjustment operations in the vertical or horizontal direction and a direction about the optical axis of the camera need only be performed for each camera in order to obtain a stereoscopic image. Therefore, the positions of two cameras can be easily adjusted within a short period of time by performing four kinds of adjustment operations.

What is claimed is:

1. An electronic image pickup device comprising:
   first and second image pickup means which are independent of each other so as to obtain a stereoscopic image;
   a supporting member which can support said first and second image pickup means so that optical axes of said first and second image pickup means are directed in the same direction;
   first and second supporting means for supporting said first and second image pickup means on said supporting member to be pivotal in a first plane direction so as to perform adjustment in the first plane direction perpendicular to the optical axes of said first and second image pickup means;
   third supporting means for supporting said first or second image pickup means on said supporting member to be pivotal in a second plane direction so as to perform adjustment in the second plane direction perpendicular to the first plane direction; and
   fourth supporting means for supporting said second or first image pickup means on said supporting member to be pivotal in a third plane direction so as to perform adjustment in the third plane direction perpendicular to the first and second plane directions.

2. A device according to claim 1, wherein said first and second image pickup means comprise first and second cameras incorporating first and second image pickup elements, respectively.

3. A device according to claim 1, wherein said supporting member supports said first image pickup means on one end portion thereof and said second image pickup means on the other end portion thereof, so that first and second image pickup means are integrally attached to said supporting member.

4. A device according to claim 1, wherein each of said first and second supporting means comprises at least two screw means, and aperture means through which said at least two screw means are loosely fitted, and which are formed in a corresponding one of said first and second image pickup means.

5. A device according to claim 1, wherein said third supporting means comprises at least two screw means, and aperture means through which said at least two screw means are loosely fitted and which are formed in said first or second image pickup means.

6. A device according to claim 1, wherein said fourth supporting means comprises at least two screw means, and aperture means through which said at least two screw means are loosely fitted and which are formed an said second or first image pickup means.

* * * * *